US011466672B2

(12) United States Patent
Tanabe

(10) Patent No.: US 11,466,672 B2
(45) Date of Patent: Oct. 11, 2022

(54) ACTUATOR

(71) Applicant: MARUWA Corporation, Osaki (JP)

(72) Inventor: Yoshio Tanabe, Osaki (JP)

(73) Assignee: MARUWA Corporation, Osaki (JP)

(*) Notice: Subject to any disclaimer, the term of this patent is extended or adjusted under 35 U.S.C. 154(b) by 238 days.

(21) Appl. No.: 16/961,067

(22) PCT Filed: Sep. 26, 2018

(86) PCT No.: PCT/JP2018/035792
§ 371 (c)(1),
(2) Date: Jul. 9, 2020

(87) PCT Pub. No.: WO2019/142403
PCT Pub. Date: Jul. 25, 2019

(65) Prior Publication Data
US 2021/0062795 A1 Mar. 4, 2021

(30) Foreign Application Priority Data

Jan. 22, 2018 (JP) .............................. JP2018-008232

(51) Int. Cl.
F03G 7/06 (2006.01)
H02N 10/00 (2006.01)
(Continued)

(52) U.S. Cl.
CPC ............ F03G 7/065 (2013.01); G06F 3/016 (2013.01); G06F 3/041 (2013.01); G06F 3/0488 (2013.01); H02N 10/00 (2013.01)

(58) Field of Classification Search
CPC . F03G 7/065; F03G 7/06; G06F 3/016; G06F 3/041; G06F 3/0488; H02N 10/00
(Continued)

(56) References Cited

U.S. PATENT DOCUMENTS 11,054,909 B2 * 7/2021 Tanabe ..................... G06F 3/016
2012/0249459 A1 * 10/2012 Sashida ................... G06F 3/041
345/173
(Continued)

FOREIGN PATENT DOCUMENTS

JP  2005-226456 A  8/2005
JP  2009-109907 A  5/2009
(Continued)

OTHER PUBLICATIONS

English translation of International Search Report of PCT/JP2018/035792, dated Dec. 25, 2018, 2 pages.

Primary Examiner — Hoang M Nguyen
(74) Attorney, Agent, or Firm — Bret E. Field; Bozicevic, Field & Francis LLP

(57) ABSTRACT

The object is to provide an actuator that moves in a shearing direction.
An actuator comprises an internal actuator including a first stator and a first mover opposed to the first stator, the first mover moving in a direction away from the first stator; a second stator having a fixation wall that is disposed in a direction in which the first stator and the first mover are opposed to each other and that is disposed along a first mover side and away from the first mover, the second stator being fixed with the first stator; and a second mover having a pressing wall inserted between the first mover and the fixation wall.

6 Claims, 17 Drawing Sheets

(51) Int. Cl.
    *G06F 3/041*     (2006.01)
    *G06F 3/01*     (2006.01)
    *G06F 3/0488*     (2022.01)

(58) Field of Classification Search
    USPC ............................ 60/527–529; 310/305–307
    See application file for complete search history.

(56) References Cited

U.S. PATENT DOCUMENTS

| | | |
|---|---|---|
| 2013/0145760 A1 | 6/2013 | Gondo |
| 2013/0154984 A1 | 6/2013 | Gondo |
| 2015/0275867 A1 | 10/2015 | Gondo |
| 2016/0102656 A1 | 4/2016 | Fujii et al. |
| 2016/0259414 A1* | 9/2016 | Fujii ........................ G06F 3/016 |
| 2017/0284379 A1 | 10/2017 | Krumpelman |
| 2019/0025973 A1* | 1/2019 | Schmitt ................... G06F 3/016 |

FOREIGN PATENT DOCUMENTS

| | | |
|---|---|---|
| JP | 2013-29821 A | 2/2013 |
| JP | 2014-88811 A | 5/2014 |
| JP | 2014-167774 A | 9/2014 |
| JP | 5836276 B2 | 12/2015 |
| JP | 5878869 B2 | 3/2016 |
| JP | 2016-79818 A | 5/2016 |
| JP | 2016-162328 A | 9/2016 |
| WO | WO2012023605 A1 | 2/2012 |

* cited by examiner

US 11,466,672 B2

ACTUATOR

CROSS-REFERENCE TO RELATED APPLICATIONS

This application is the national phase under 35 U. S. C. § 371 of PCT International Application No. PCT/JP2018/035792 which has an International filing date of Sep. 26, 2018, which claims priority under 35 U.S.C. § 119 on Patent Application No. 2018-008232 filed in Japan on Jan. 22, 2018, and designated the United States of America.

FIELD

The present invention relates to an actuator.

BACKGROUND

An actuator has been disclosed in which a stator having alternate peaks and valleys at regular intervals and a mover having alternate peaks and valleys at regular intervals are oppositely disposed such that the peaks of one of the stator and the mover are opposed to the valleys of the other, and a wire made of a shape memory alloy is disposed between the opposing peaks and valleys along the direction in which the peak and valleys are aligned (WO2012/023605).

Pulse voltage is applied to the wire to contract the wire by Joule heat, which widens the space between the stator and the mover.

The Joule heat generated in the wire is swiftly dissipated through the peaks with which the wire is in contact, which returns the wire to its original length. This allows the space between the stator and the mover to return to the original state soon.

SUMMARY

The above-described actuator, however, allows for movement in the direction in which the distance between the oppositely-disposed mover and stator varies while it does not allow for movement in a direction crossing this direction, a so-called shearing direction.

As one aspect, it is an object of the present invention to provide an actuator capable of moving in the shearing direction.

An actuator comprises an internal actuator comprising a first stator and a first mover opposed to the first stator, the first mover moving in a direction away from the first stator; a second stator having a fixation wall that is disposed in a direction in which the first stator and the first mover are opposed to each other and that is disposed along a first mover side and away from the first mover, the second stator being fixed with the first stator; and a second mover having a pressing wall to be inserted between the first mover and the fixation wall.

In one aspect, it is possible to provide an actuator that can move in the shearing direction.

The above and further objects and features will more fully be apparent from the following detailed description with accompanying drawings.

DETAILED DESCRIPTION

Embodiment

Figure 1:
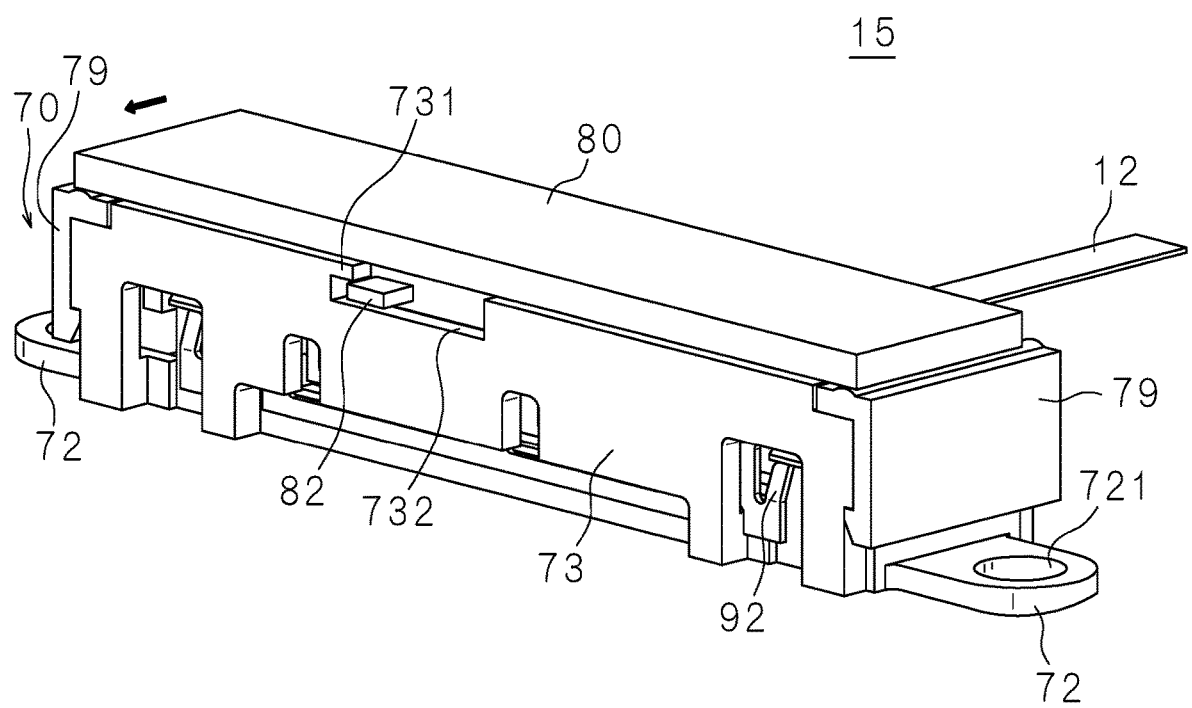
FIG. 1 is a perspective view of an actuator.

FIG. 1 is a perspective view of an actuator. The actuator 15 includes a second stator 70 having a substantially rectangular box shape and a second mover 80 covering an opening of the second stator 70, and has a substantially rectangular parallelepiped shape as a whole.

The actuator 15 is connected to a flexible printed circuits (FPC) 12. By application of pulse voltage to the actuator 15 through the FPC 12, the second mover 80 instantly moves in an in-plane direction indicated by the bold arrow in FIG. 1 and returns to the original state immediately. The actuator 15 is incorporated in an apparatus, for example, a smartphone, a tablet or the like in a manner to be described below, and provides the user who touches the apparatus with tactile sensation such as a click feeling or the like by an instant movement of the mover.

Figure 2:
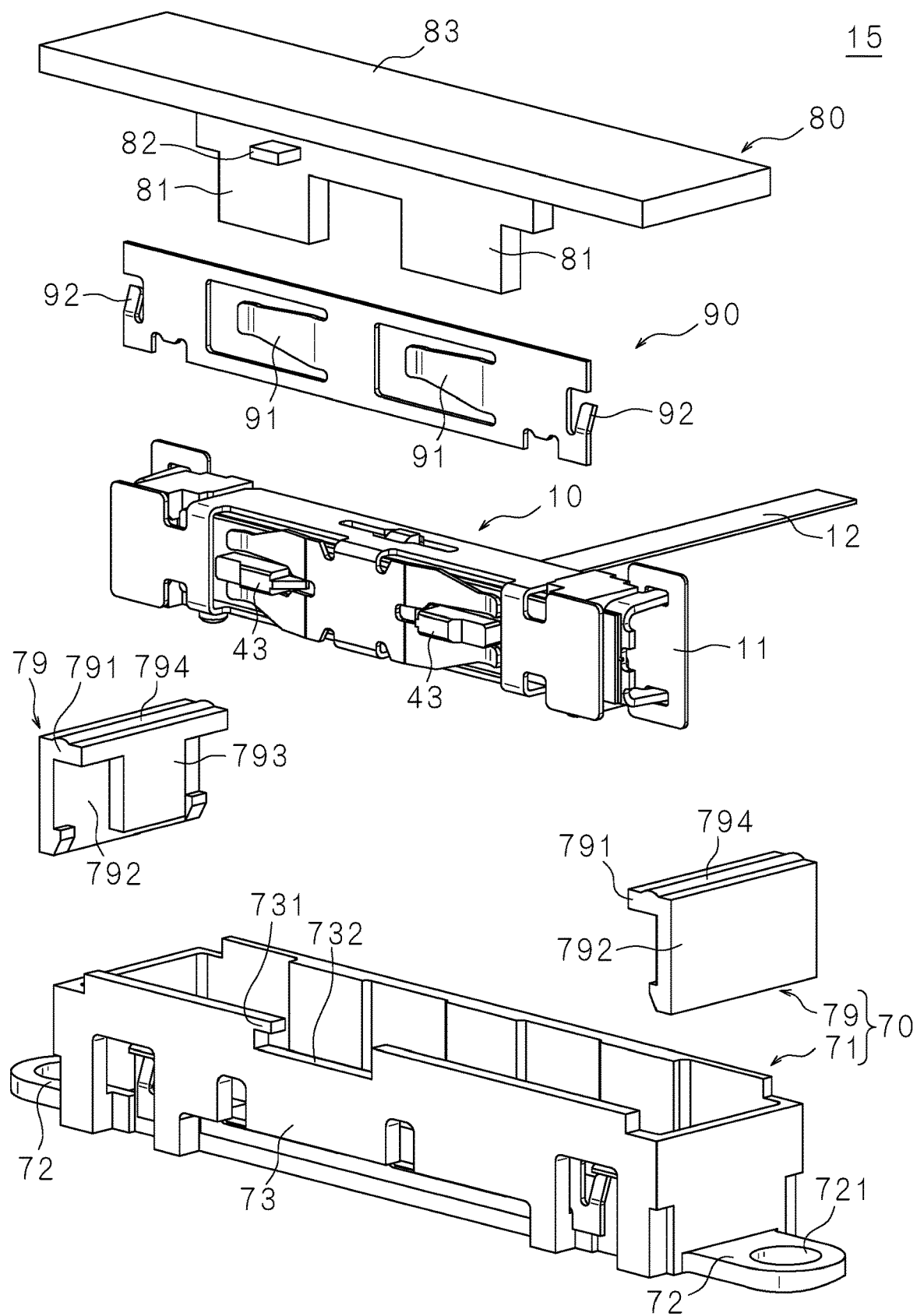
FIG. 2 is an exploded perspective view of the actuator.

FIG. 2 is an exploded perspective view of the actuator 15. The actuator 15 includes a flat spring 90 and an internal actuator 10 as well as the second mover 80 and the second stator 70 that are described above. The structure of the internal actuator 10 will be described later.

The second stator 70 includes a box-shaped housing 71 with an opening on one side and two edge frame portions 79. The housing 71 has a substantially-rectangular bottom surface. A fixation wall 73, which is a side wall on the front side in FIG. 2, stands upright from a long side of the bottom surface and has a substantially rectangular cut-away portion 732 at the center of the edge portion thereof. The fixation wall 73 has a retainer reception portion 731 protruding rightward from the left edge of the cut-away portion 732 in FIG. 2.

The housing 71 has two mounting portions 72 extending outward from the short sides of the bottom surface. Each of the mounting portions 72 has a mounting aperture 721. The actuator 15 is secured to another apparatus by screws or the like that are inserted into the mounting apertures 721. The housing 71 is formed by die casting that is characterized by forcing metal, for example, aluminum or the like under high pressure into a mold. The housing 71 may be formed by injection molding of resin.

Each of the edge frame portions 79 has a substantially-rectangular guide plate portion 791, a side surface plate portion 792 extending from one long side of the guide plate portion 791, and a latch portion 793 protruding in a direction the same as the side surface plate portion 792 from the central portion of the other long side of the guide plate portion 791. The long side of the guide plate portion 791 has substantially the same length as the short side of the bottom surface of the housing 71. The side surface plate portion 792 has a retainer protruding on the same side as the guide plate portion 791 on its tip end. The space between the side surface plate portion 792 and the latch portion 793 is substantially the same as the thickness of the side wall of the housing 71.

The guide plate portion 791 has a ridge-like raised portion 794 having a substantially semicylindrical shape extending in parallel with its long side on the surface opposite to the surface from which the side surface plate portion 792 and the latch portion 793 protrude. It is noted that the ridge-like raised portion 794 may have any tapered ridge shape such as a substantially triangular prism shape, or the like. The edge frame portion 79 is made of resin having high slidability, for example, polytetrafluoroethylene or the like.

As illustrated in FIG. 1, the second stator 70 is formed such that the edge frame portion 79 is engaged with the edge of the short side of the housing 71 while the side surface plate portion 792 faces outside and the latch portion 793 faces inside. The ridge-like raised portions 794 are raised along the edge of the short side of the second stator 70.

Returning to FIG. 2, the second mover 80 includes a rectangular plate-shaped lid portion 83 having substantially the same dimensions as those of the bottom surface of the housing 71 and two sheets of pressing walls 81 substantially vertically protruding from a peripheral edge along the long side of the lid portion 83. The two sheets of pressing walls 81 are connected at the root thereof to form a U-shaped plate. A prism-shaped retainer protrusion 82 protrudes from the vicinity of the root of the left pressing wall 81 in FIG. 2.

The flat spring 90 has a rectangular plate shape one size smaller than the fixation wall 73 and has two U-shaped apertures that are arranged in the same orientation along the long side direction. Each of the apertures has an inner portion bent in the depth direction in FIG. 2 forming a biasing portion 91 of a flat spring. The flat spring 90 has rectangular flat spring latch portions 92 that are formed by substantially L-shaped cut-aways provided at the edges of the short sides thereof and that bend in the same direction as the biasing portion 91.

The flat spring 90 is produced by bending a metal plate for a flat spring such as a stainless steel plate for spring, a beryllium copper plate, or the like that has been cut in a predetermined shape. The flat spring 90 may be made of resin.

Figure 3:
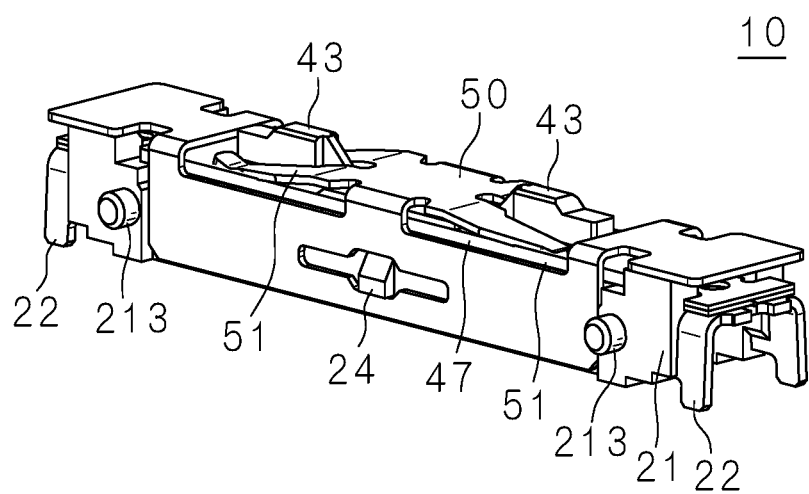
FIG. 3 is a perspective view of an internal actuator.

FIG. 3 is a perspective view of the internal actuator 10. FIG. 3 shows a state in which the internal actuator 10 illustrated in FIG. 2 is rotated to 90 degrees regarding the right and left direction in FIG. 2 as an axis. The internal actuator 10 has a substantially rectangular parallelepiped shape.

Figure 4:
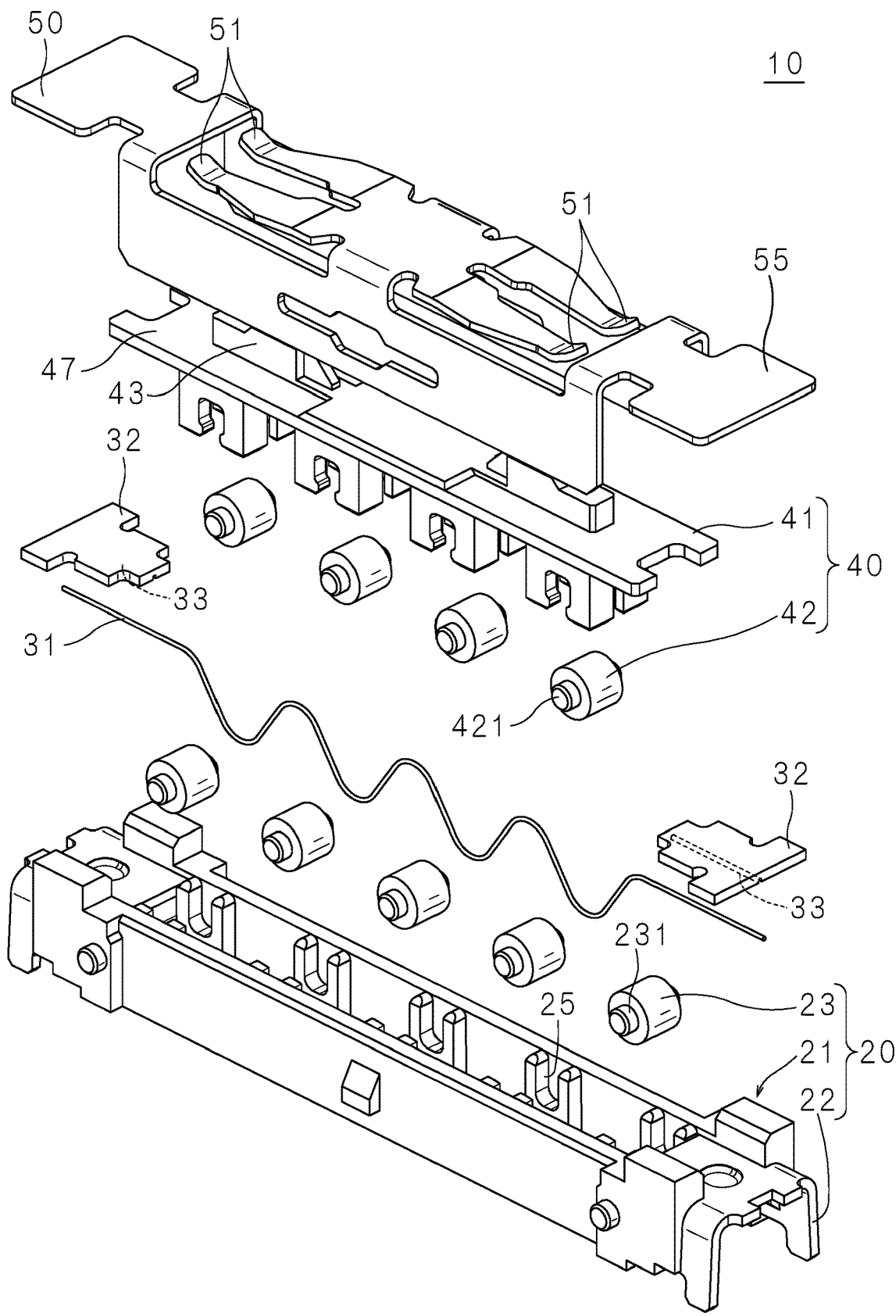
FIG. 4 is an exploded perspective view of the internal actuator.

FIG. 4 is an exploded perspective view of the internal actuator 10. The internal actuator 10 includes a first stator 20, a first mover 40 and a fastener 50. The fastener 50 has four biasing springs 51 that press the first mover 40 against the first stator 20. The details of the structure of the first stator 20, the first mover 40 and the fastener 50 will be described later.

Figure 5:
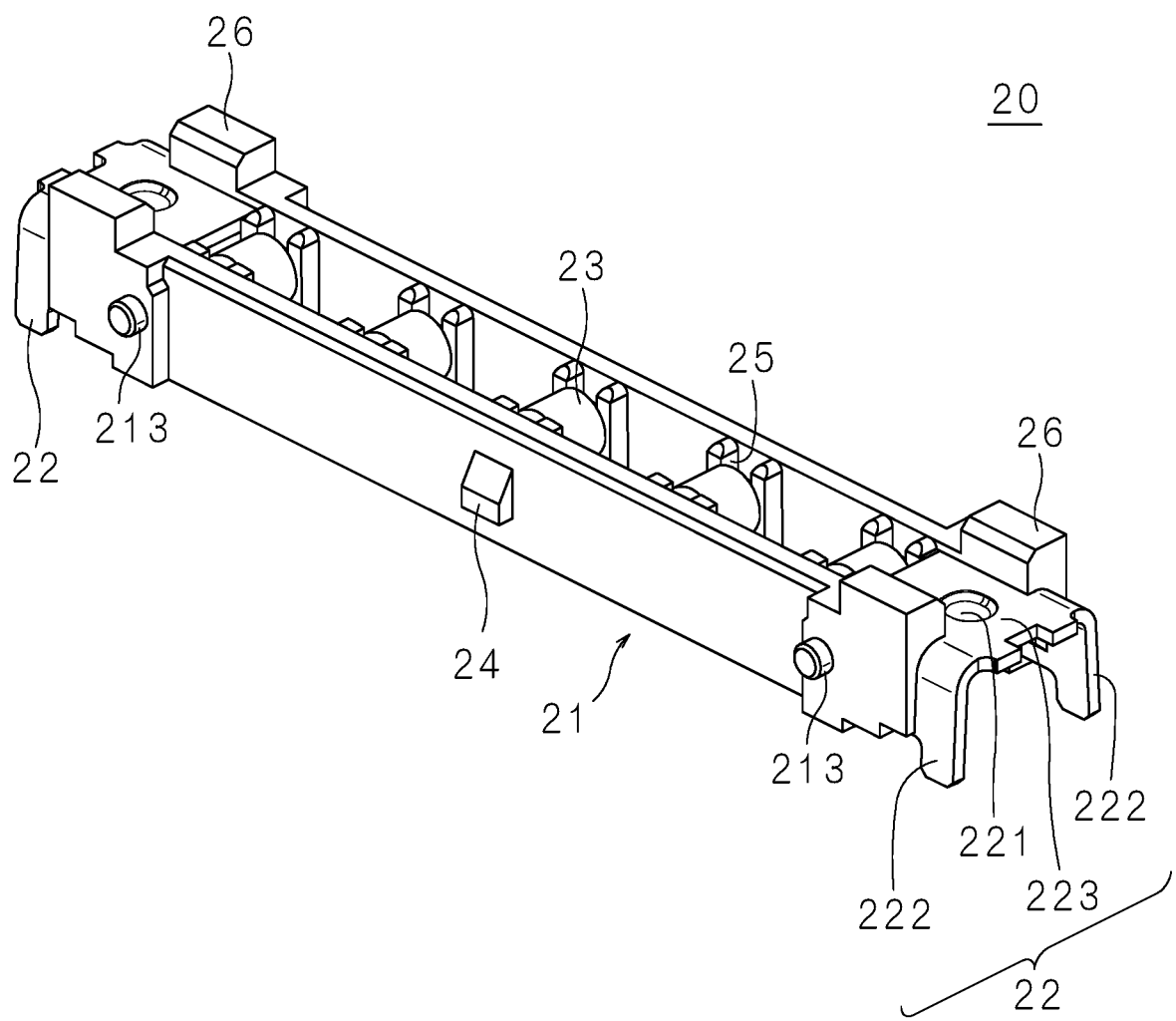
FIG. 5 is a perspective view of a first stator.

FIG. 5 is a perspective view of the first stator 20. With reference to FIGS. 4 and 5, the structure of the first stator 20 will be described. The first stator 20 has a stator frame 21, stator terminals 22 and five stator rollers 23.

Each of the stator rollers 23 is cylindrical. Each of the stator rollers 23 has cylindrical stator shaft portions 231 coaxially protruding from both end surfaces thereof. That is, the stator roller 23 has a stepped cylindrical shape having the stator shaft portions 231 on both ends that are thinner than the central portion.

The stator roller 23 is made of a material having high thermal conductivity. The material of the stator roller 23 includes, for example, metals such as aluminum, copper or the like, or ceramics such as aluminum nitride, silicon nitride or the like. The stator roller 23 may be made of resin.

The stator frame 21 is a substantially rectangular frame, and has five pairs of roller supporting portions 25 between the inner surfaces along the long side thereof. The roller supporting portions 25 in each pair are opposed to each other, and each of the roller supporting portions 25 is a substantially U-shaped groove that opens toward the direction the same as an opening of the stator frame 21. The width of the opening portion of the roller supporting portion 25 is a little greater than the diameter of the stator shaft portion 231. A single stator roller 23 is rotatably supported by a pair of opposing roller supporting portions 25.

From the four corners of the stator frame 21, fastener supporting portions 26 each having a substantially rectangular parallelepiped shape protrude in the direction toward which the stator frame 21 opens. The protruded height of the four fastener supporting portions 26 are equal. At a central part of the outer surfaces of both of the walls along the long side of the stator frame 21, fastener fixing protrusions 24 having a substantially rectangular parallelepiped shape are provided. At both ends of the outer surface of the one of the walls along the long side, cylindrical bosses 213 are provided so as to protrude in the direction in which the fastener fixing protrusions 24 protrude. The stator frame 21 is made of a material having insulation properties, for example, resin, ceramic or the like.

The stator terminals 22 are provided on both ends in the long side direction of the stator frame 21. The stator terminals 22 each have a rectangular terminal plate portion 223 that is disposed between the two fastener supporting portions 26 and outwardly extends from each end of the stator frame 21. From the edge of the terminal plate portions 223, terminal leg portions 222 extend along the long-side surface of the stator frame 21. At the central part of the terminal plate portion 223, a terminal concave portion 221, which is a shallow recess, is provided.

Each stator terminal 22 is formed by bending a metal plate having high electrical conductivity such as brass, phosphor bronze or the like. The surface of the stator terminal 22 is coated with a layer for easy soldering such as a tin-plated layer, a gold-plated layer, or the like. The two stator terminals 22 are insulated from each other. The two stator terminals 22 are formed as an integral part of the stator frame 21 by insert molding.

The surface of the right and left terminal plate portions 223 are desirably close to the tangential line common to the five stator rollers 23. The reason will be described later.

Figure 6:
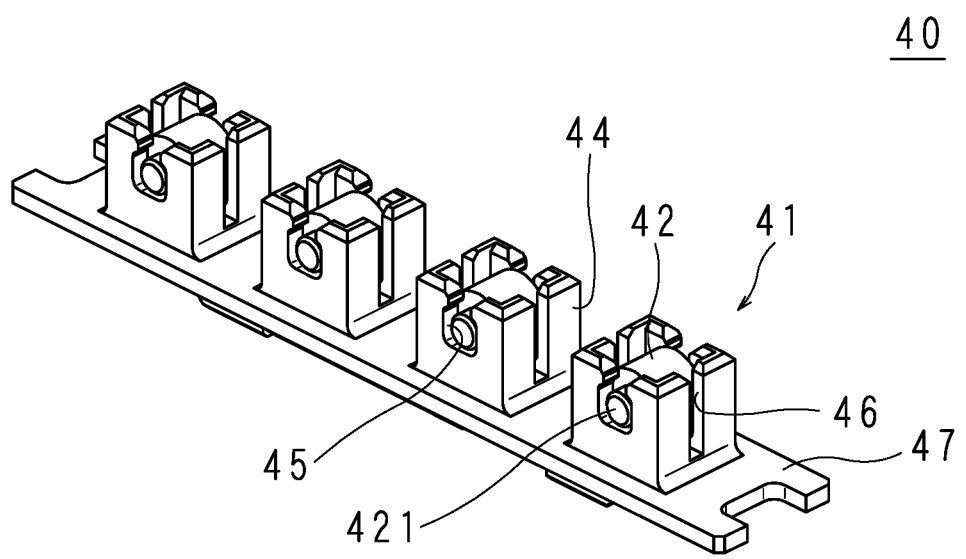
FIG. 6 is a perspective view of a first mover.

FIG. 6 is a perspective view of the first mover 40. FIG. 6 illustrates the first mover 40 in FIG. 4 upside down. With reference to FIGS. 4 and 6, the structure of the first mover 40 will be described. The first mover 40 has a mover frame 41 and four mover rollers 42.

Each of the mover rollers 42 is cylindrical. Each of the mover rollers 42 has cylindrical mover shaft portions 421 coaxially protruding from both end surfaces thereof. The mover roller 42 is made of a material having high thermal conductivity.

The mover frame 41 has a top plate portion 47 and four rectangular box-shaped roller holding portions 44. The top plate portion 47 has a substantially rectangular plate shape having substantially the same length in the short side direction as the stator frame 21 and having a shorter length in the long side direction as compared with the stator frame 21. The roller holding portions 44 are arranged on one of the surfaces of the top plate portion 47 in the long side direction of the top plate portion 47. At the central part of the walls located in the direction crossing the direction in which the roller holding portions 44 are arranged, a first wire passing groove 46 is provided.

On the walls along the direction in which roller holding portions 44 are arranged, roller holding grooves 45 are provided. Each of the roller holding grooves 45 has a substantially U shape and narrows its width at its opening to form a retainer. The width of the roller holding groove 45 is a little greater than the diameter of the mover shaft portion 421. The mover frame 41 is made of a material having insulation properties, for example, resin, ceramic, or the like.

A single mover roller 42 is rotatably supported inside the roller holding portion 44 by a pair of opposing roller holding grooves 45. The action of the retainer provided at the entrances of the roller holding grooves 45 prevents the mover roller 42 from falling even if the top plate portion 47 is placed at the upper side while holding the first mover 40.

As illustrated in FIGS. 3 and 4, on the surface opposite to the surface provided with the roller holding portions 44 of the top plate portion 47, two substantially rectangular parallelepiped pressing portions 43 are aligned in the long side direction. The two pressing portions 43 have the same protruded height from the top plate portion 47.

Figure 7:
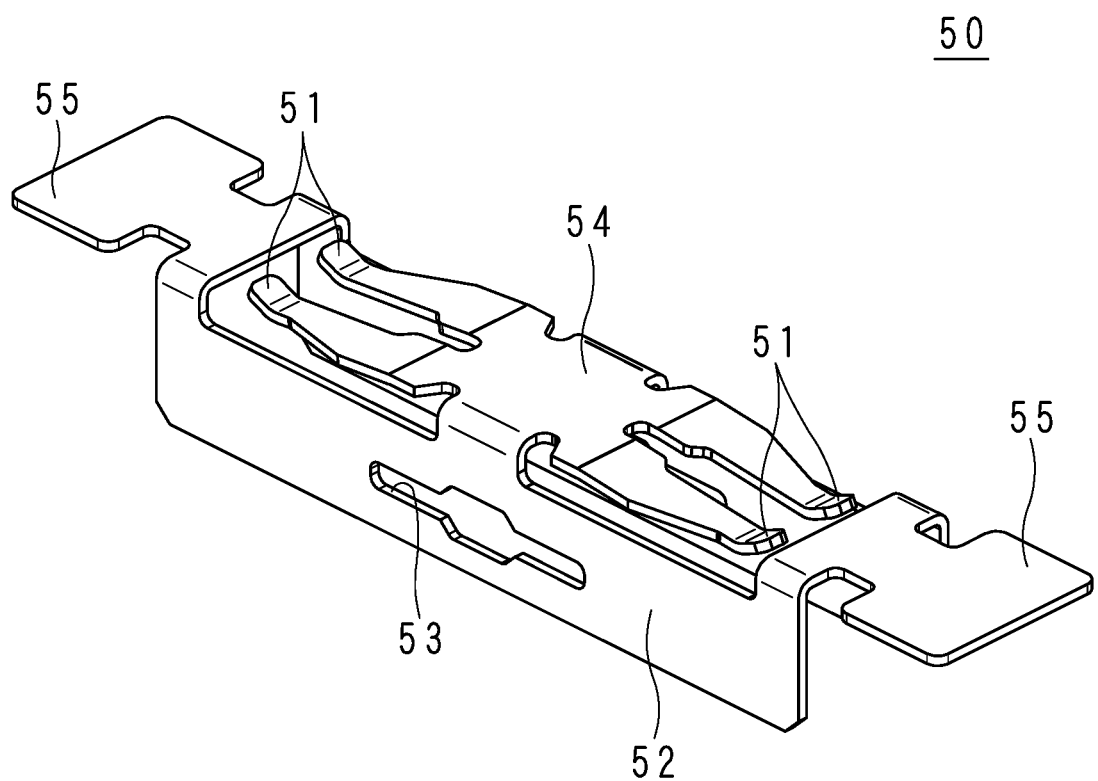
FIG. 7 is a perspective view of a fastener.

FIG. 7 is a perspective view of the fastener 50. The structure of the fastener 50 will be described in detail below with reference to FIG. 7. The fastener 50 has two side plate portions 52 that are opposed to each other. Each of the side plate portions 52 is substantially rectangular elongated in the right-left direction. The two sheets of the side plate portions 52 are connected by a connecting portion 54 spanning the space therebetween at the central portion and by supporting plate portions 55 spanning the space therebetween at both ends.

The connecting portion 54 is substantially rectangular having the long side direction the same as that of the side plate portion 52. From each of the edges of the short side of the connecting portion 54, two tapered biasing springs 51 extend. The biasing springs 51 gently bend in the direction the same as the side plate portion 52 and bend in the opposite direction near the tip end. Hence, a total of four biasing springs 51 are formed on both sides of the connecting portion 54. The function of the biasing springs 51 will be described later.

Each of the supporting plate portions 55 is substantially rectangular. The two sheets of the supporting plate portions 55 are flush with the connecting portion 54. At the central portion of each side plate portion 52, a mounting aperture 53, which is a slot elongated in the direction parallel to the long side direction of the side plate portion 52, is provided. The mounting aperture 53 is wider at the central portion. The function of the mounting aperture 53 will be described below.

The space between the two sheets of the side plate portions 52 is substantially the same as the axially external dimension of the stator roller 23 of the first stator 20. The length between the both edges of the two sheets of the supporting plate portions 55 along the long side direction of the side plate portion 52 is substantially the same as the length in the long side direction of the first stator 20.

The fastener 50 is produced by bending a metal plate for a flat spring such as a stainless steel plate for spring, a beryllium copper plate, or the like that has been cut in a predetermined shape. The fastener 50 may be made of resin.

Figure 8:
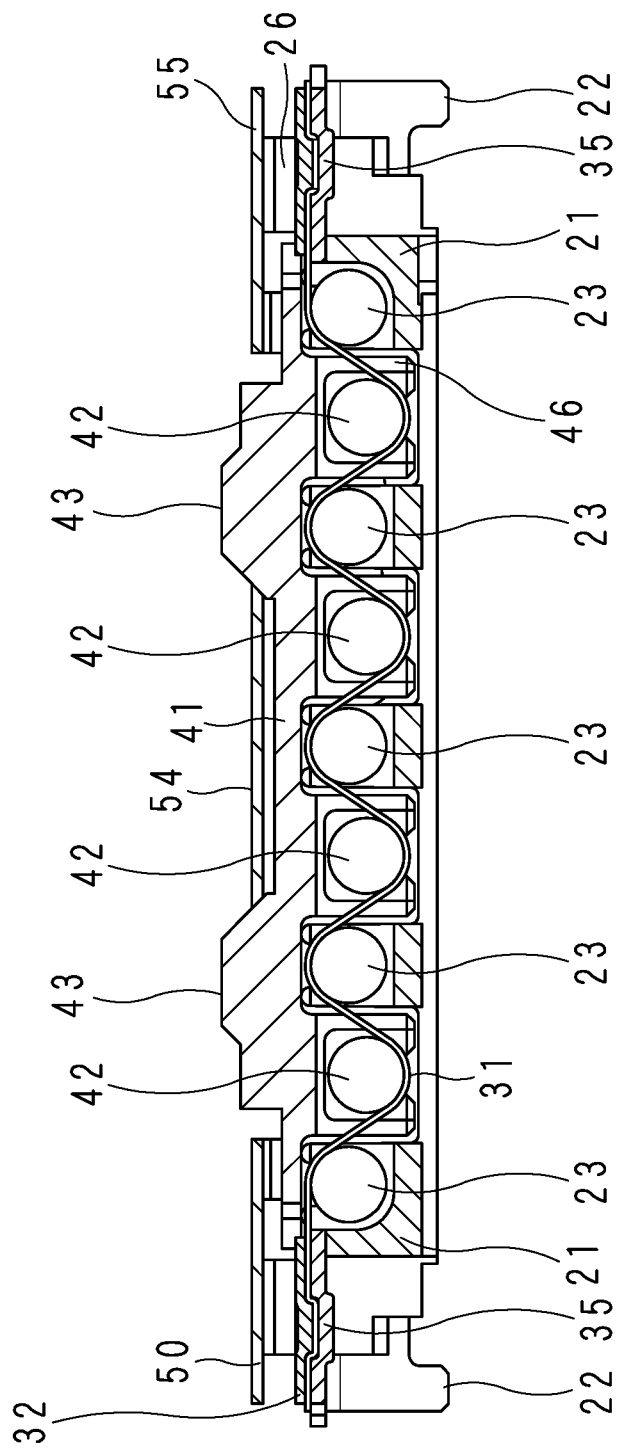
FIG. 8 is a cross-sectional view of the internal actuator.

FIG. 8 is a cross-sectional view of the internal actuator 10. With reference to FIGS. 3 to 8, the outline of the assembly method for the internal actuator 10 will be described.

As described with reference to FIG. 5, the stator shaft portions 231 of the stator roller 23 are inserted into the roller supporting portions 25 of the stator frame 21 to assemble the first stator 20. As described with reference to FIG. 6, the mover shaft portions 421 of the mover roller 42 are inserted into the roller holding grooves 45 of the mover frame 41 to assemble the first mover 40.

A wire 31 is placed along the direction in which the stator rollers 23 are aligned. The wire 31 has a diameter a little less than 0.1 mm. The wire 31 is capable of passing through the above-mentioned first wire passing groove 46. The wire 31 is made of a shape memory alloy. The wire 31 instantly shortens by approximately 4% to 5% if the temperature exceeds the transformation point, and returns to the original length when cooled. The transformation point of the wire 31 used in the present embodiment is on the order of 70° C. to 100° C.

The first mover 40 is positioned relative to the first stator 20 such that the mover rollers 42 are opposed to the respective clearances between the stator rollers 23. Here, the position of the wire 31 is adjusted such that the first wire passing groove 46 is aligned with the wire 31.

The first mover 40 is brought closer to the first stator 20 such that the mover rollers 42 and the mover frame 41 are inserted into the stator frame 21. As illustrated in FIG. 5, between the inner surfaces of the front wall and the rear wall of the stator frame 21, concavities are formed between the roller supporting portions 25 to receive the respective roller holding portions 44.

The wire 31 is drawn into the interior of the stator frame 21 by rotations of the stator rollers 23 and the mover rollers 42 to have a wavy shape alternately passing through the first mover 40 side of the stator rollers 23 and the first stator 20 side of the mover rollers 42 as illustrated in FIG. 8. The wire 31 passes through the first wire passing groove 46 between the stator rollers 23 and the mover rollers 42.

The side surface on the first mover 40 side of the stator roller 23 serves as a stator convex portion for supporting the wire 31 on the first stator 20 side. The side surface on the first stator 20 side of the mover roller 42 serves as a mover convex portion for supporting the wire 31 on the first mover 40 side.

The action of the stator rollers 23 and the mover rollers 42 can prevent a trouble, for example, a break in the wire 31 or the like during assembly due to excessive tensile stress applied to a part of the wire 31. This makes it possible to achieve installation of the first stator 20 and the first mover 40 at high speed and high yielding.

Returning to FIG. 4, fixation of the ends of the wire 31 will be described. As illustrated in FIG. 4, the internal actuator 10 has two sheets of second terminal plates 32 being substantially T-shaped plates. The second terminal plate 32 has a wire holding groove 33 at the portion corresponding to the leg of the "T" as indicated by the broken line on one surface thereof. The wire holding groove 33 is a U-shaped groove having substantially the same width and depth as the contour of the wire 31. The second terminal plate 32 is made of a metal having high electrical conductivity such as brass, phosphor bronze or the like.

The second terminal plate 32 is stacked on the terminal plate portion 223 with the wire 31 fit into the wire holding groove 33. A punch is pressed from the second terminal plate 32 side to the position corresponding to the terminal concave portion 221 while the terminal plate portion 223 is supported by a die to thereby swage and fix the terminal plate portion 223, the wire 31 and the second terminal plate 32, thereby achieving the swaging and fixing of the wire 31.

By swaging and fixing, the wire 31, the stator terminal 22 and the second terminal plate 32 are electrically and mechanically connected. This allows for better electrical conduction between the wire 31 and the stator terminals 22. Then, the redundant portions of the wire 31 positioned outside the stator terminal 22 are cut and removed, which brings about a state where the wire 31 are connected at both ends to the respective stator terminals 22.

Next, the fastener 50 is placed over the first mover 40 to engage the mounting apertures 53 with the fastener fixing protrusions 24. The details will be described. As illustrated in FIGS. 3 and 5, the surface of the fastener fixing protrusion 24 on the first mover 40 side is outwardly tilted. The edge of the side plate portion 52 spreads over the tilted surface of the fastener fixing protrusion 24. As described above, the mounting aperture 53 is a slot, through which the fastener fixing protrusion 24 can pass by elastic deformation. After the fastener 50 allows the fastener fixing protrusion 24 to pass through the mounting aperture 53, it is elastically recovered. Hence, the fastener fixing protrusion 24 is engaged with the mounting aperture 53 as illustrated in FIG. 3.

The first mover 40 is pressed against the first stator 20 by the biasing springs 51. As described above, a total of four biasing springs 51 are provided on the short sides of the connecting portion 54, so that the first mover 40 are evenly pressed against the stator 20 in the long side direction and in the short side direction thereof. This brings about a state where the pressing portions 43 protrude from the spaces between the biasing springs 51 on the right and left sides as illustrated in FIG. 3. This completes the internal actuator 10 illustrated in FIG. 3.

As illustrated in FIGS. 3 and 8, the fastener supporting portions 26 abuts against the supporting plate portions 55 to thereby fix the fastener 50 on the stator frame 21. As illustrated in FIG. 3, the biasing springs 51 bias the top plate portion 47 toward the first stator 20.

As illustrated in FIG. 8, a space is provided between the connecting portion 54 and the top plate portion 47. The function of the space will be described later.

The five stator rollers 23 and the four mover rollers 42 are alternately arranged in parallel. The wire 31 is curved so as to alternately pass through the first mover 40 side of the stator rollers 23 and the first stator side 20 of the mover rollers 42. The edge portion of the stator terminals 22, which are connected to both ends of the wire 31, protrude downward exceeding the bottom surface of the stator frame 21.

Returning to FIG. 2, the stator terminals 22 of the internal actuator 10 are inserted into the holes provided on the substrate 11 so as to be electrically and mechanically connected by soldering, or the like. The two stator terminals 22 are connected to a wiring pattern on the FPC 12 via a wiring pattern (though not illustrated) provided on the substrate 11. This allows pulse voltage to be applied across the two connection terminals of the internal actuator 10 through the FPC 12 and the substrate 11.

Figure 9:
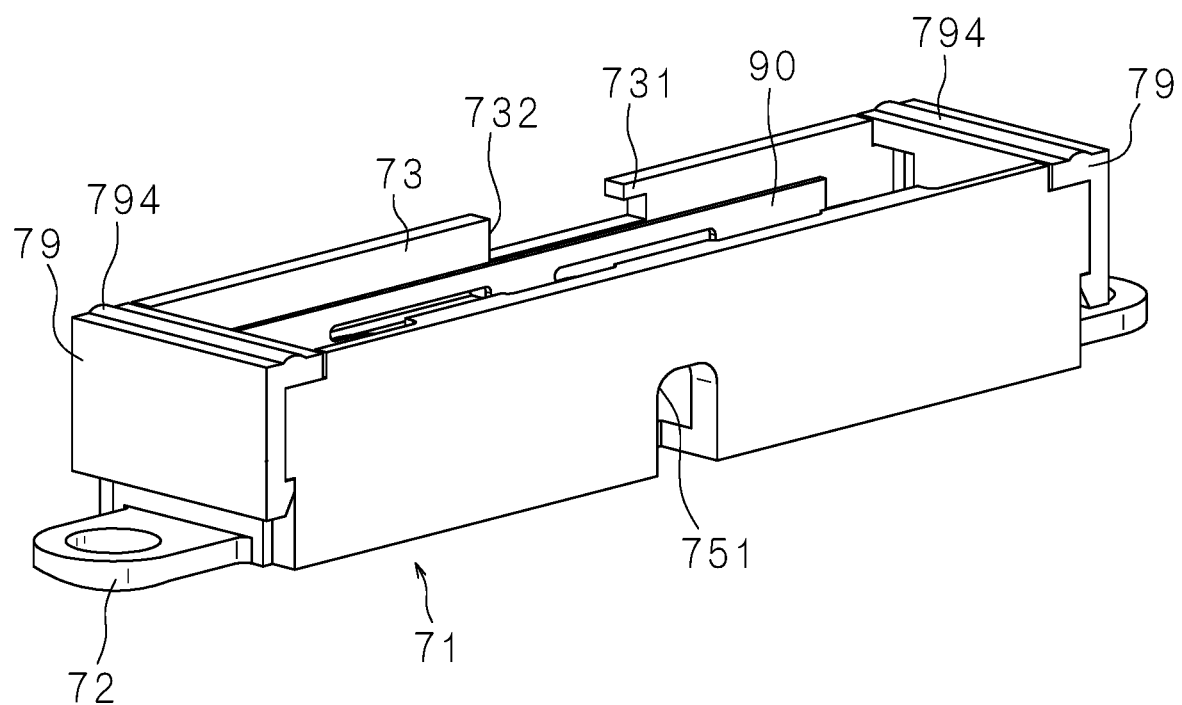
FIG. 9 illustrates an assembly process of the actuator.
Figure 10:
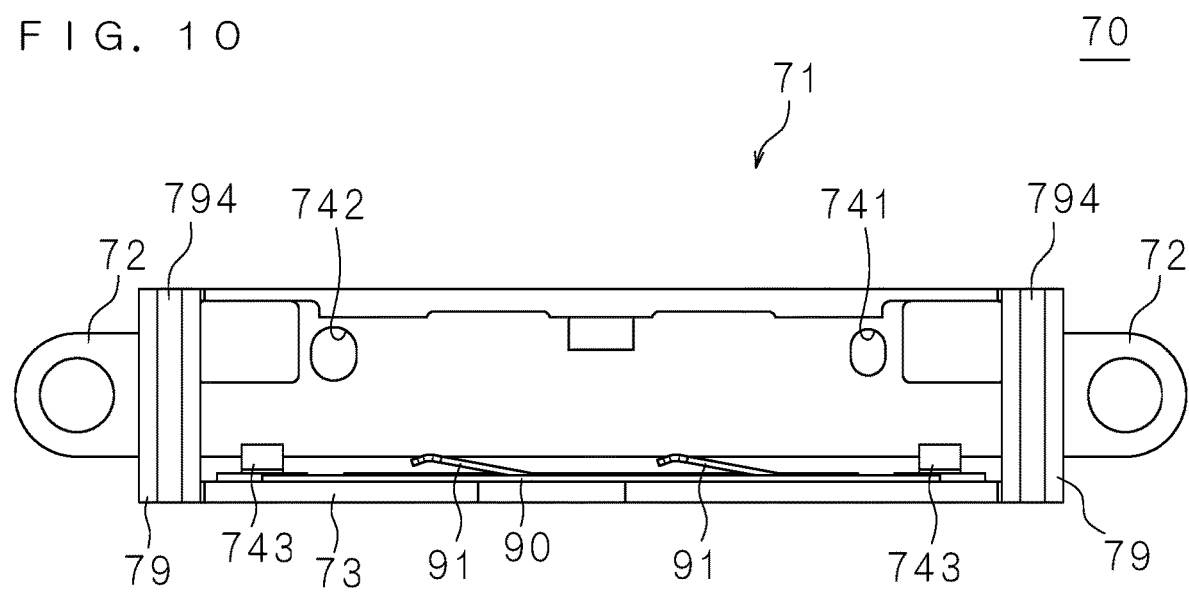
FIG. 10 illustrates the assembly process of the actuator.

FIG. 9 to FIG. 14 illustrate the assembly process of the actuator 15. FIG. 9 is an perspective view of the housing 71 to which the edge frame portions 79 and the flat spring 90 have been attached when viewed from the side opposing to FIG. 2. FIG. 10 illustrates a top view of the housing 71 to which the edge frame portion 79 and the flat spring 90 have been attached similarly to FIG. 9.

The housing 71 has two prismatic flat spring fixing protrusions 743 extending from the bottom surface thereof along the fixation wall 73. The space between the fixation wall 73 and the flat spring fixing protrusion 743 is substantially the same as the thickness of the flat spring 90. As illustrated in FIG. 10, the flat spring 90 is inserted between the fixation wall 73 and the flat spring fixing protrusions 743 with the biasing portions 91 facing opposite to the fixation wall 73. The flat spring latch portions 92 described with reference to FIG. 2 hook the depressions provided in the housing 71 and functions as retainers as illustrated in FIG. 1.

On the bottom surface of the housing 71, a first boss aperture 741 and a second boss aperture 742 that have oval cross sections are arranged with their major axes along the short side direction of the housing 71. The space between the major axis of the first boss aperture 741 and the major axis of the second boss aperture 742 is substantially the same as the space between the two bosses 213 disposed on the internal actuator 10 as described with reference to FIG. 3.

The minor axis of the first boss aperture 741 is substantially the same as the diameter of the boss 213 described with reference to FIG. 3. The minor axis of the second boss aperture 742 is greater than the diameter of the boss 213 by approximately 0.2 mm to 0.5 mm.

Figure 11:
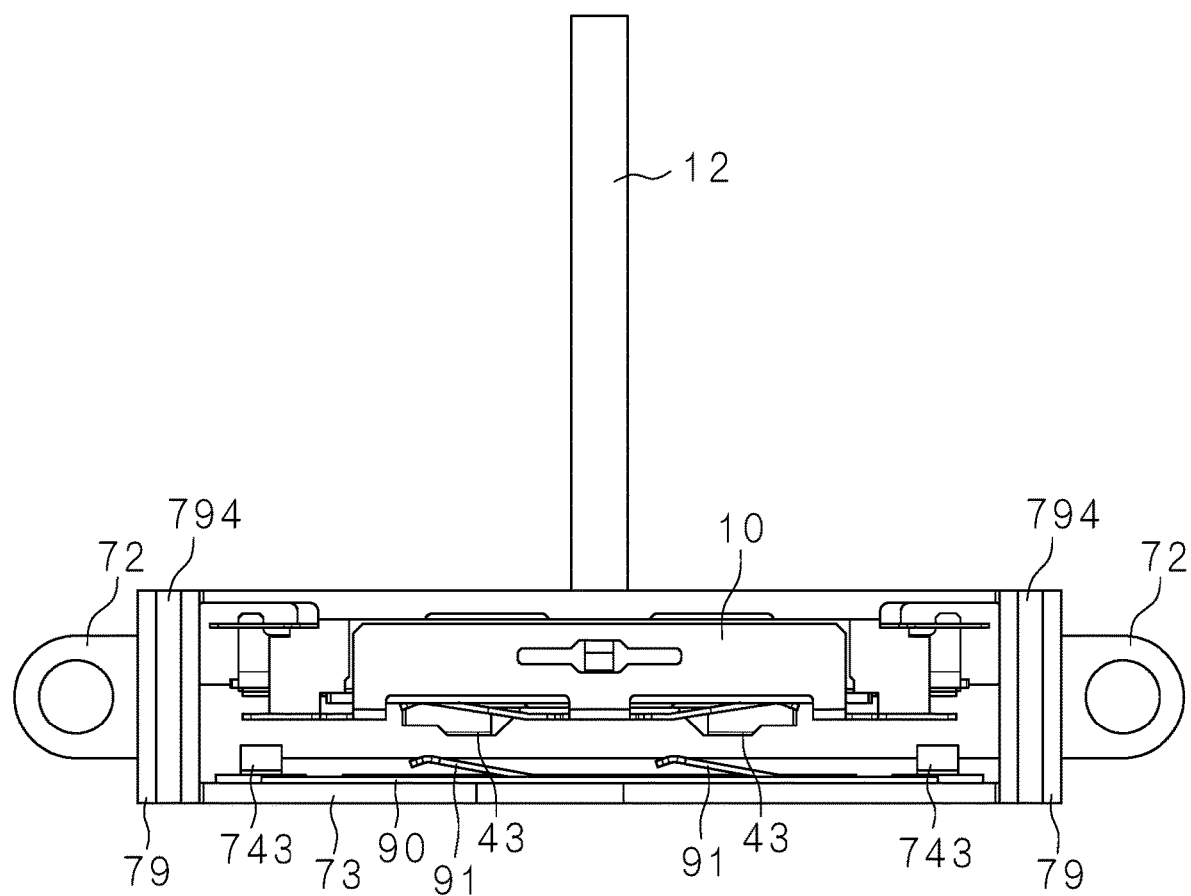
FIG. 11 illustrates the assembly process of the actuator.

FIG. 11 illustrates a state where the internal actuator 10 has been inserted into the housing 71 with the pressing portions 43 opposed to the biasing portions 91. The respective two bosses 213 of the internal actuator 10 are inserted into the first boss aperture 741 and the second boss aperture 742. The first boss aperture 741 has the function of fixing the position of the internal actuator 10 in the long side direction of the housing 71 at a predetermined position. The second boss aperture 742 has a play to thereby absorb an effect of production errors of the housing 71 and the internal actuator 10.

As illustrated in FIG. 9, the housing 71 has an FPC hole 751 on the side surface opposing to the fixation wall 73. As illustrated in FIG. 2, the FPC 12 attached to the internal actuator 10 is drawn out of the housing 71 through the FPC hole 751.

Figure 12:
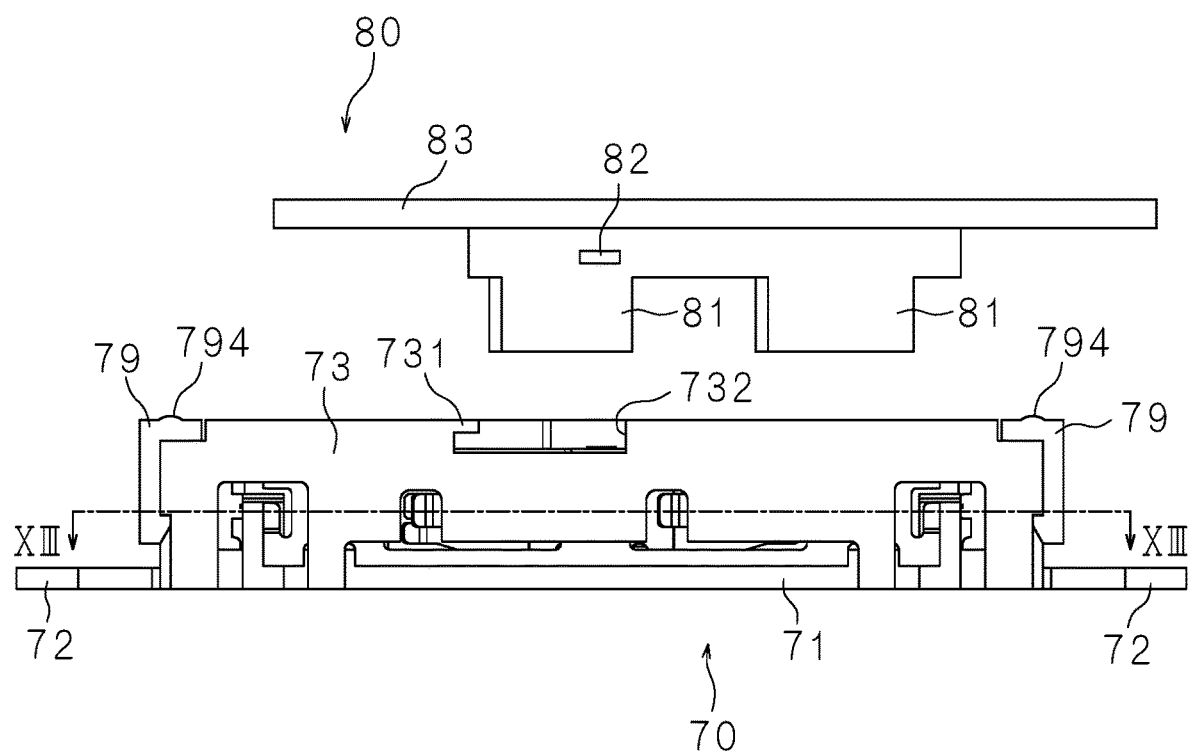
FIG. 12 illustrates the assembly process of the actuator.

FIG. 12 is a side view illustrating a state where the second mover 80 is being attached to the second stator 70. While facing the pressing walls 81 toward the opening of the housing 71, the second mover 80 is positioned such that the retainer protrusion 82 is engaged with the cut-away portion 732, away from the retainer reception portion 731.

Figure 13:
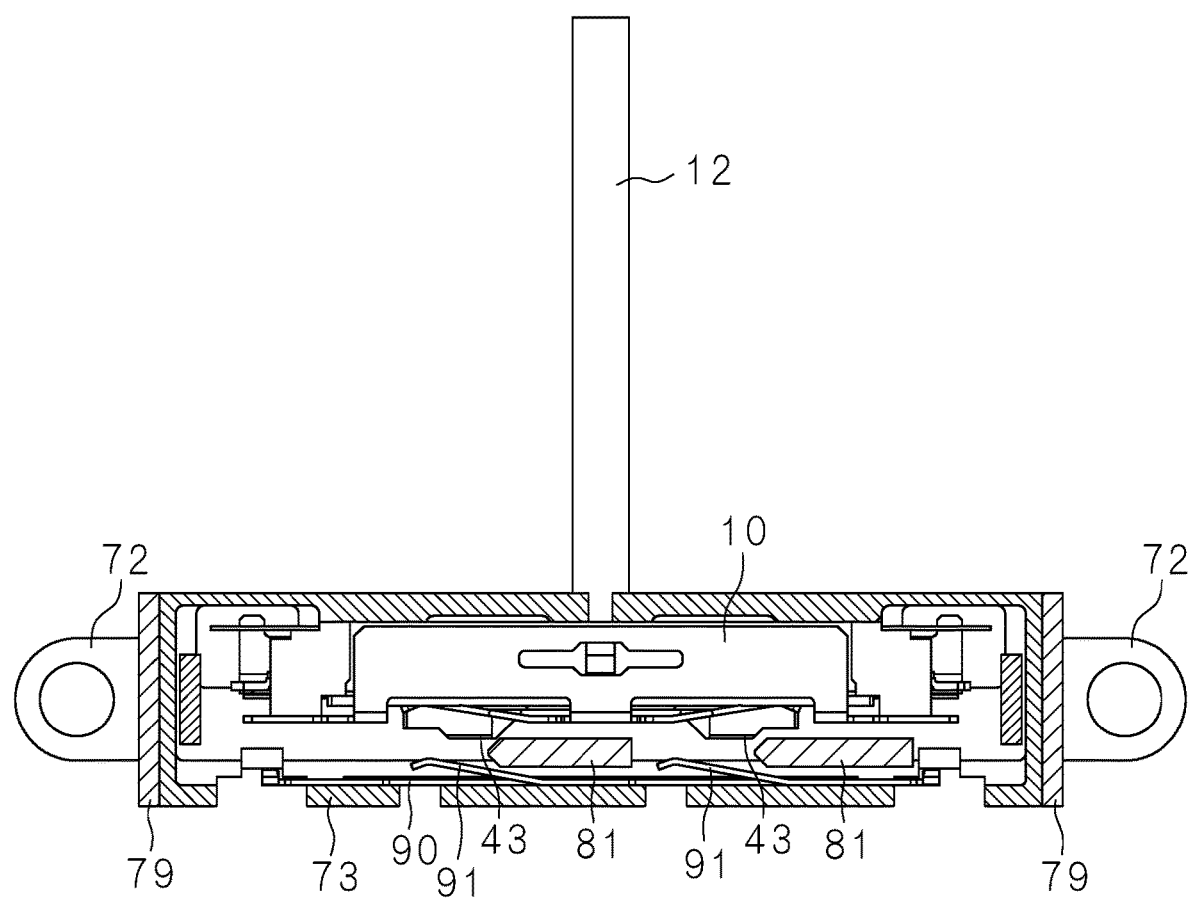
FIG. 13 illustrates the assembly process of the actuator.

FIG. 13 illustrates a cross-sectional view taken along line XIII-XIII in FIG. 12 after the pressing walls 81 have been inserted into the housing 71 until the lid portion 83 impacts the ridge-like raised portions 794. The pressing walls 81 are located at portions where the biasing portions 91 do not project. This allows the pressing walls 81 to easily be inserted between the biasing portions 91 and the internal actuator 10.

Figure 14:
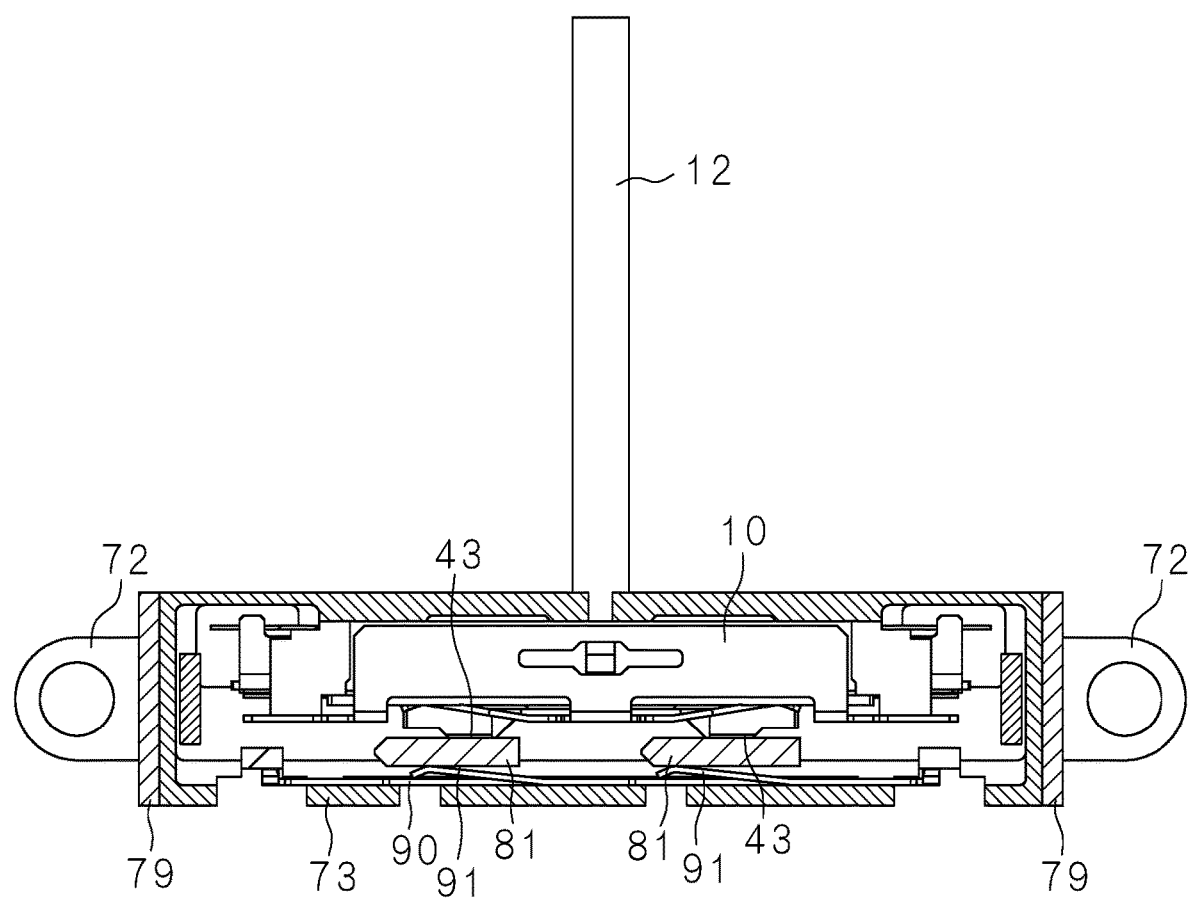
FIG. 14 illustrates the assembly process of the actuator.

FIG. 14 illustrates a state where the second mover 80 has slid from the state illustrated in FIG. 13 to the left in FIG. 13 relative to the second stator 70. As illustrated in FIGS. 13 and 14, the pressing walls 81 are tapered at the left edge surface to thereby move while widening the space between the biasing portions 91 and the pressing portions 43.

As illustrated in FIG. 1, the retainer protrusion 82 is engaged with the retainer reception portion 731. Hence, the actuator 15 illustrated in FIG. 1 is completed. It is desirable that there is a clearance between the retainer protrusion 82 and the retainer reception portion 731. The function of this clearance will be described below.

Figure 15:
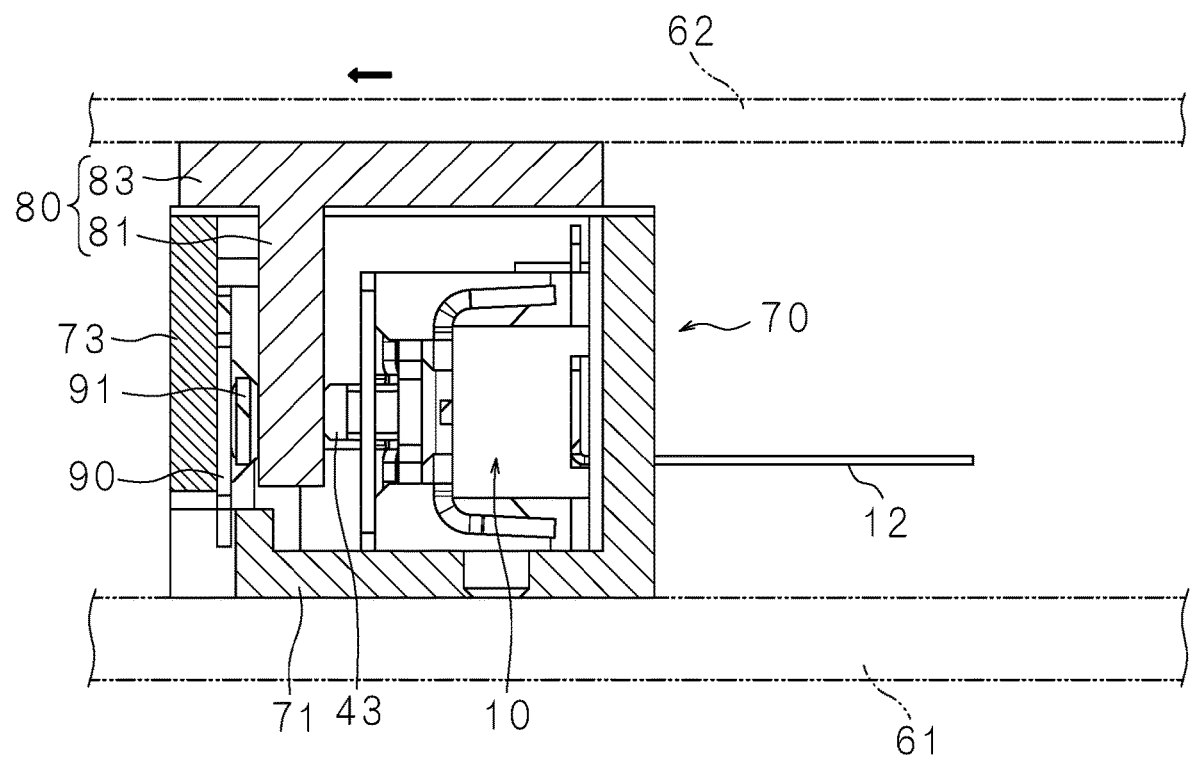
FIG. 15 is a cross-sectional view of the actuator.

FIG. 15 is a cross-sectional view of the actuator 15. FIG. 15 illustrates a cross section obtained when the actuator 15 is cut through a section passing through the pressing wall 81 and the pressing portion 43. The actuator 15 is used while being sandwiched from top and bottom between a first plate 61 and a second plate 62 as shown with the phantom line in FIG. 15.

The first plate 61 is a casing of an information apparatus such as a smartphone, a tablet, or the like, and is fixed to the housing 71 by screws or the like inserted into the mounting apertures 721. The second plate 62 is a component, for example, a glass substrate set on the surface of the touch panel or the like that is to be touched by the user who uses the apparatus incorporated with the actuator 15, or a component around such a component. The lid portion 83 and the second plate 62 are fixed by a double-sided adhesive tape, for example.

In the states illustrated in FIGS. 14 and 15, the pressing walls 81 are biased toward the internal actuator 10 by the biasing portions 91.

Figure 16:
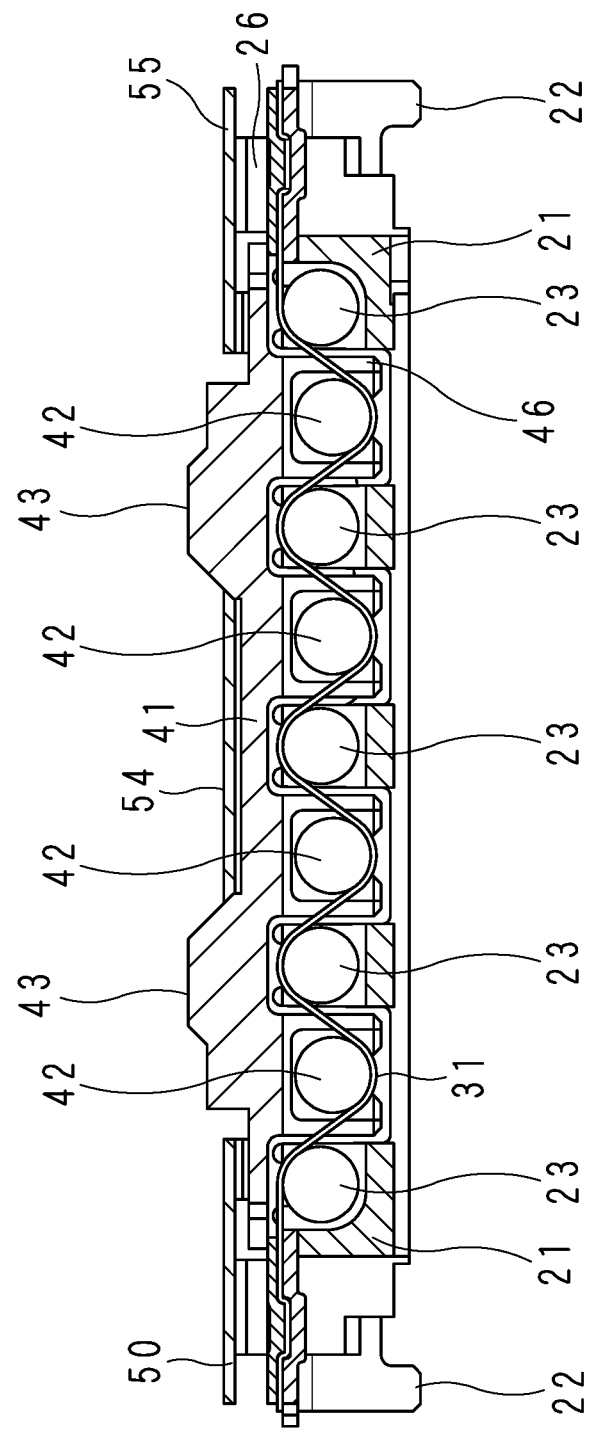
FIG. 16 illustrates an operating state of the internal actuator.

The operation of the actuator 15 will be described. FIG. 16 illustrates an operating state of the internal actuator 10. With reference to FIGS. 8 and 16, the operation of the internal actuator 10 will be described.

FIG. 8 illustrates the initial state of the internal actuator 10. By application of pulse voltage across the stator terminals 22 via the FPC 12, the wire 31 instantly generates heat by Joule heat. The wire 31 instantly shortens if the temperature exceeds the transformation point. The wire 31 shortens to thereby move the mover rollers 42 in the direction away from the first stator 20. As the mover rollers 42 move, the first mover 40 pushes the biasing springs 51 to move in the direction away from the first stator 20.

The above-described space between the connecting portion 54 and the top plate portion 47 is the space through which the top plate portion 47 can move if the first mover 40 is moved. The space is high enough to prevent a collision between the connecting portion 54 and the top plate portion 47 if predetermined pulse voltage is applied across the two stator terminals 22.

When the application of the pulse voltage is completed, the generation of Joule heat is stopped. The heat generated in the wire 31 is dissipated to the outside through the stator rollers 23 and the mover rollers 42, which lowers the temperature of the wire 31 to the transformation point or below. By the action of the biasing springs 51, the first mover 40 is pressed against the first stator 20, which returns the internal actuator 10 to the state described with reference to FIG. 8.

The heat capacity of the wire 31 is much smaller than that of the entire internal actuator 10, so that even if the actuator 10 is operated by repetitively applying pulse voltage, the temperature of the entire actuator 10 is scarcely raised. It is noted that the internal actuator 10 may be attached with a cooling mechanism such as a Peltier element, a heatsink or the like if it is frequently operated.

As described above, by application of pulse voltage, the space between the first stator 20 and the first mover 40 instantly increases and then returns to the original state.

Returning to FIG. 14, the first mover 40 instantly presses the pressing walls 81 toward the fixation wall 73. Then, the pressing walls 81 return to the original state by the action of the biasing portions 91. That is, the second mover 80 moves cooperatively with the first mover 40. At this time, the first stator 20 and the second stator 70 are still.

Hence, by application of pulse voltage through the FPC 12, the second mover 80 instantly moves as indicated by the bold arrow in FIG. 1 and returns to the original state. Along the side surfaces of the housing 71 on the short side, the ridge-like raised portions 794 are provided, which reduces the friction between the second mover 80 and the second stator 70. Hence, it is possible to provide the actuator 15 that allows the second mover 80 to instantly move if pulse voltage is applied.

Figure 17:
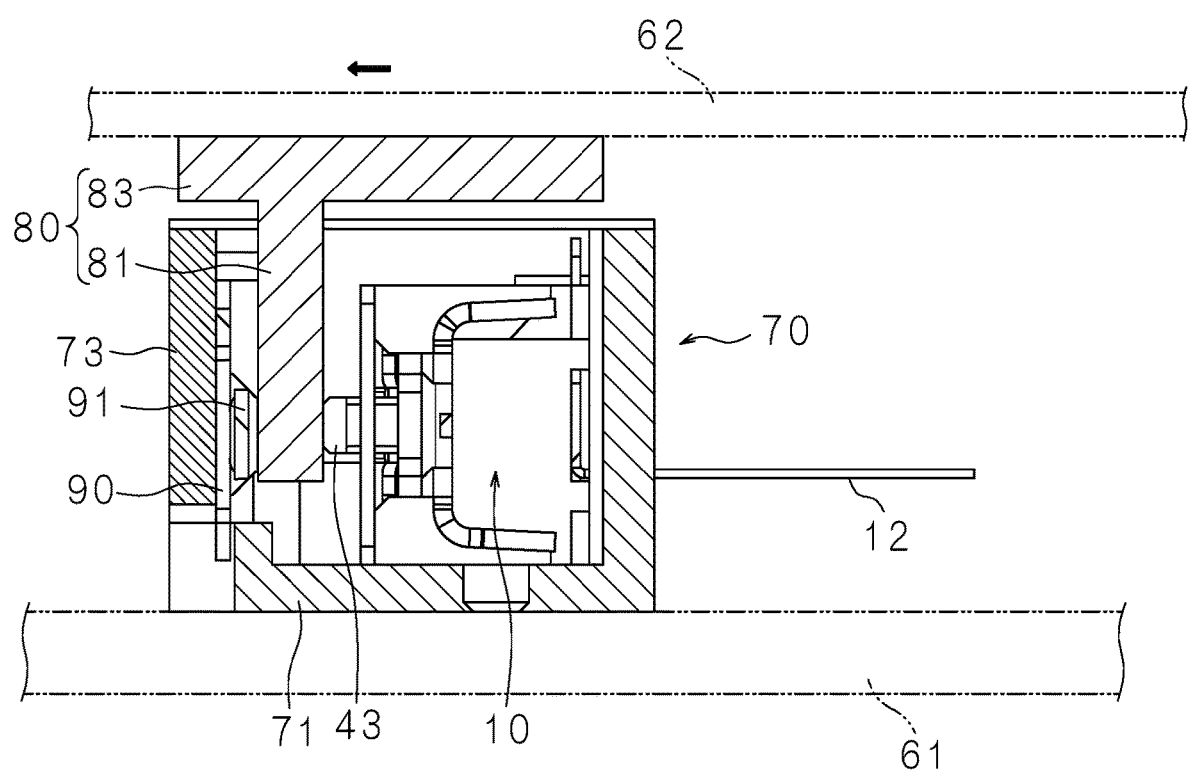
FIG. 17 is a cross-sectional view illustrating a usage state of the actuator.

FIG. 17 is a cross-sectional view illustrating the actuator 15 in use. FIG. 17 illustrates an example where the space between the first plate 61 and the second plate 62 is wider than that in FIG. 15. As described above, the second stator 70 is fixed to the first plate 61, while the second mover 80 is fixed to the second plate 62.

In FIG. 17, the pressing wall 81 is slightly pulled out of the housing 71. Here, the pressing wall 81 can be pulled out by the length of the clearance between the retainer protrusion 82 and the retainer reception portion 731. Similarly to FIG. 15, the pressing wall 81 is biased toward the pressing portions 43 by the biasing portion 91. Thus, it is possible to provide the actuator 15 capable of being attached even if there are variations in the distance between the first plate 61 and the second plate 62.

According to the present embodiment, the actuator 15 may be achieved that can instantly move to the shearing direction relative to the direction in which the second stator 70 and the second mover 80 are stacked. According to the present embodiment, the internal actuator 10 that is compact and undergoes instant displacement can be provided. The internal actuator 10 in the present embodiment is fit for a so-called tactile device application that presents tactile sensation, for example, a click feeling or the like to the user.

As described with reference to FIG. 15, in the case where the actuator 15 in the present embodiment is used for a touch panel of an information apparatus such as a tablet or the like, motion sound incidental to the movement of the actuator 15 is reflected in the in-plane direction of the touch panel. This makes it possible to provide the actuator 15 that produces motion sound less audible to the user who uses the touch panel.

According to the present embodiment, it is possible to provide the actuator 15 that is easily attachable irrespective of the dimensional variations in the apparatuses to be attached.

By the action of the biasing springs 51, the first mover 40 returns to the original position at every motion. This allows the first mover 40 to repeatedly move by a predetermined travel amount from a predetermined travel start position every time pulse voltage is applied. Thus, it is possible to achieve the internal actuator 10 that has stable characteristics.

Similarly, by the action of the biasing portions 91, the second mover 80 also returns to the original position at every motion. This allows the second mover 80 to repeatedly move by a predetermined travel amount from a predetermined travel start position every time pulse voltage is applied. Thus, it is possible to achieve the actuator 15 that has stable characteristics.

The first wire passing groove 46 prevents the wire 31 from meandering and dropping off the mover rollers 42 and the stator rollers 23. By the first wire passing groove 46, the state of the wire 31 is uniformly maintained. This makes it possible to achieve the actuator 15 that operates with stability.

If imbalance depending on the position occurs in the extension and contraction of the wire 31, the stator rollers 23 and the mover rollers 42 are automatically rotated to maintain the tension applied to the wire 31 uniform. Accordingly, even if a thin wire 31 is used, a break in the wire 31 can be prevented.

It is noted that the stator roller 23 may integrally be formed with the stator frame 21. Similarly, the mover roller 42 may integrally be formed with the mover frame 41. In these cases, the portions corresponding to the stator convex portions and the mover convex portions that are in contact with the wire 31 may be made slidable by highly lubricating coating, thereby preventing a break in the wire 31.

In the case where a thin wire 31 is used, the resistance of the wire 31 increases. If Joule heat is generated by pulse driving of a constant voltage here, the current value flowing in the wire 31 is reduced accordingly. This makes it possible to provide the actuator 15 that consumes small current.

Furthermore, if a thin wire 31 is used, the heat capacity of the wire 31 is reduced. Thus, the Joule heat generated by pulse driving is dissipated soon. This makes it possible to provide the internal actuator 10 that has a fast response speed. This can also provide the actuator 15 that causes less temperature rise because the Joule heat generated in the wire 31 is little even in the case of repetitive use.

The stator rollers 23 and the mover rollers 42 are respectively held in the stator frame 21 and the mover frame 41 that have insulating properties, and are insulated from each other. Thus, even if a material having high thermal conductivity and high electrical conductivity, for example, copper or the like is used for the stator roller 23 and the mover roller 42, application of pulse voltage to both ends of the wire 31 is not prevented.

The internal actuator 10 is not limited to the structures described with reference to FIGS. 3 to 8. Any internal actuator 10 in which the first mover 40 instantly moves relative to the first stator 20 can be used.

The apparatus to be attached with the actuator 15 is not limited to a touch-sensitive information apparatus such as a smartphone, a tablet or the like. The actuator 15 may be attached to the handle, the seat or the like of a transport apparatus such as an automobile, a motorcycle, a bicycle or the like. Additionally, the actuator 15 may be attached to any apparatus touchable by the user.

The actuator 15 is operated in accordance with the operation performed by the user to thereby enable feedback against the operation through tactile sensation. Moreover, the actuator 15 is operated if abnormality occurs during automatic driving, for example, which allows the user to notice it through tactile sensation.

The lid portion 83 may take any shape depending on the portion to which the actuator 15 is mounted. For example, the lid portion 83 may have a hole through which a pin is to be inserted from above or a threaded hole through which a screw is to be fastened. The lid portion 83 may be a protrusion or a recess to be engaged with the portion to which the actuator 15 is to be mounted.

The actuator 15 may be used with the second mover 80 side thereof fixed close to the part touched by the user.

Any of the technical features (the constituent features) described in the respective embodiments can be combined with each other, and such a combination can form a new technical feature.

It is to be understood that the embodiments disclosed here are illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a," "an," and "the" include plural referents unless the context clearly dictates otherwise.

The invention claimed is:

1. An actuator, comprising:
an internal actuator comprising a first stator and a first mover opposed to the first stator, the first mover moving in a direction away from the first stator;
a second stator having a fixation wall that is disposed in a direction in which the first stator and the first mover are opposed to each other and that is disposed along a first mover side and away from the first mover, the second stator being fixed with the first stator;
a flat spring having a biasing portion and being attached to the fixation wall; and
a second mover having a pressing wall that is to be inserted between the first mover and the biasing portion and biased to the first mover side by the biasing portion and a lid portion having a rectangular plate shape with a peripheral edge from which the pressing wall vertically protrudes.

2. The actuator according to claim 1, wherein
the second stator has a box shape for accommodating the internal actuator,
the fixation wall is a side wall of the second stator, and
the lid portion covers an opening of the second stator.

3. The actuator according to claim 2, wherein
the second stator has a ridge-like raised portion on an edge surface of a side wall adjacent to the fixation wall along a long side of the edge surface, and
the lid portion abuts against the ridge-like raised portion.

4. The actuator according to claim 1, wherein
the internal actuator includes a wire made of a shape memory alloy,
the first stator includes a plurality of stator convex portions,
the first mover includes a mover convex portion arranged between the stator convex portions, and
the wire is located between the first stator and the first mover along a direction in which the stator convex portions are aligned.

5. The actuator according to claim 2, wherein
the internal actuator includes a wire made of a shape memory alloy,
the first stator includes a plurality of stator convex portions,
the first mover includes a mover convex portion arranged between the stator convex portions, and
the wire is located between the first stator and the first mover along a direction in which the stator convex portions are aligned.

6. The actuator according to claim 3, wherein
the internal actuator includes a wire made of a shape memory alloy,
the first stator includes a plurality of stator convex portions,
the first mover includes a mover convex portion arranged between the stator convex portions, and
the wire is located between the first stator and the first mover along a direction in which the stator convex portions are aligned.

* * * * *